(12) United States Patent
Harter et al.

(10) Patent No.: US 11,061,668 B2
(45) Date of Patent: Jul. 13, 2021

(54) SYSTEM AND METHOD FOR ENABLING REUSABLE CODE ACROSS APPLICATIONS OF DIFFERENT OPERATING SYSTEMS

(71) Applicant: Xevo Inc., Bellevue, WA (US)

(72) Inventors: Glenn R. Harter, Wellington, FL (US); Stephen K. Spear, Jr., Jupiter, FL (US)

(73) Assignee: XEVO INC., Bellevue, WA (US)

( * ) Notice: Subject to any disclaimer, the term of this patent is extended or adjusted under 35 U.S.C. 154(b) by 108 days.

(21) Appl. No.: 16/107,731

(22) Filed: Aug. 21, 2018

(65) Prior Publication Data

US 2020/0065092 A1 Feb. 27, 2020

(51) Int. Cl.
| | |
|---|---|
| *H04L 29/08* | (2006.01) |
| *G06F 8/76* | (2018.01) |
| *G06F 9/54* | (2006.01) |
| *H04W 4/44* | (2018.01) |

(52) U.S. Cl.
CPC ............... *G06F 8/76* (2013.01); *G06F 9/547* (2013.01); *H04L 67/327* (2013.01); *H04W 4/44* (2018.02)

(58) Field of Classification Search
CPC . G06F 8/76; G06F 9/547; H04W 4/44; H04L 67/327
See application file for complete search history.

(56) References Cited

U.S. PATENT DOCUMENTS

| | | | |
|---|---|---|---|
| 9,448,776 B1 * | 9/2016 | Sankaran | G06F 16/972 |
| 2006/0165040 A1 * | 7/2006 | Rathod | G06Q 10/10 370/335 |
| 2014/0026113 A1 * | 1/2014 | Farooqi | G06F 8/34 717/107 |
| 2014/0068101 A1 * | 3/2014 | Mann | H04L 67/28 709/238 |
| 2014/0156734 A1 * | 6/2014 | Stankoulov | H04M 1/7253 709/203 |

(Continued)

OTHER PUBLICATIONS

"A short Story about React Native," JobNinja Blog, Jan. 15, 2018, https://jobninja.com/blog/short-story-react-native/.

(Continued)

*Primary Examiner* — Nicholas R Taylor
*Assistant Examiner* — Sanjoy Roy
(74) *Attorney, Agent, or Firm* — Seed IP Law Group LLP

(57) ABSTRACT

A method and system for enabling use of a reusable-code section across applications of different operating systems. For a first application designed for a first operating system ("OS"), a first native-code section and a reusable-code section are defined as part of the first application. For a second application designed for a second OS, a second native-code section and the reusable-code section are defined as part of the second application, and the second application is incapable of running on the first OS. The first and second native-code sections communicate with a web-services server, which communicates with a plurality of backend-services servers, at least some of which are controlled by different entities. The web-services server coordinates the execution of service requests with the backend-services servers on behalf of the first and second applications. The reusable-code section facilitates the display of user-interface elements when the first and second applications are executed.

17 Claims, 6 Drawing Sheets

(56) References Cited

U.S. PATENT DOCUMENTS

2015/0178034 A1* 6/2015 Penilla ................ G06F 3/04845
345/1.1
2015/0292137 A1* 10/2015 Leonard .................. G01G 9/00
702/173
2016/0292137 A1 10/2016 Warila et al.

OTHER PUBLICATIONS

The International Search Report and Written Opinion of the International Searching Authority, or the Declaration, dated Jan. 9, 2020, for International Application No. PCT/US19/50873, International Filing Date : Sep. 12, 2019, 15 Pages.

* cited by examiner

SYSTEM AND METHOD FOR ENABLING REUSABLE CODE ACROSS APPLICATIONS OF DIFFERENT OPERATING SYSTEMS

BACKGROUND

Technical Field

The present disclosure relates generally to systems that support communications between applications and backend services.

Description of the Related Art

Many automobile manufacturers offer applications, or apps, to their customers for permitting the customers to download the apps to access backend services provided by the manufacturers or associated third parties. For example, a car owner may access such an app through the owner's smartphone to remotely unlock the owner's vehicle. These mobile apps are generally designed to function on one of two different operating systems ("OS"): (1) iOS (IOS®), created by Apple Inc. of Cupertino, Calif. and (2) Android™, developed by Google, Inc. of Mountain View, Calif.

The design of a mobile app in this setting is often complicated because it may be required to communicate with multiple backend services, each of which is operated by a different company, to execute a task initiated by the owner. Moreover, the manufacturer must maintain a dedicated development team for its iOS app and a separate one for its Android app. This complexity and need for increased staffing is further exacerbated as the quantity of backend services—and the number of companies operating together to provide them—escalates. A manufacturer that offers multiple brands (or makes) of vehicles is further burdened by this inefficient arrangement.

BRIEF SUMMARY

A method for enabling use of reusable code across applications of different operating systems ("OS") is described herein. For a first application designed for a first OS, a first native-code section can be defined as part of the first application, and the first native-code section can be configured to communicate with a web-services server. The web-services server can be configured to communicate with a plurality of backend-services servers, at least some of which may be controlled by different entities. A reusable-code section can also be defined as part of the first application, and the reusable-code section can be configured to facilitate the display of one or more predetermined user-interface ("UI") elements when the first application is executed on the first OS.

For a second application designed for a second OS and incapable of executing on the first OS, a second native-code section can be defined as part of the second application, and the second native-code section can be configured to communicate with the web-services server. The reusable-code section defined for the first application can be implemented as part of the second application. The reusable-code section may be configured to facilitate the display of the predetermined UI elements when the second application is executed on the second operating system. As an option, a common set of communications can be defined for exchanges between the first application and the web-services server and between the second application and the web-services server.

In one embodiment, the first native-code section may have a communications section configured to manage communications between the first application and the web-services server and can include a head-unit ("HU") section configured to facilitate communications between the first application and an HU of a vehicle. The second native-code section can include a communications section configured to manage communications between the second application and the web-services server and can have an HU section configured to facilitate communications between the second application and an HU of a vehicle.

In one embodiment, the reusable-code section can be configured to facilitate the display of the predetermined UI elements on an HU of a vehicle when the first application is executed on the first OS of a first smartphone and when the second application is executed on the second OS of a second smartphone. The first application can be configured to enable a user to select a service provided by one or more of the backend-service servers and can be further configured to exchange communications related to the selected service with only the web-services server. Further, the web-services server may be configured to manage the exchange of communications related to the selected service between itself and the backend-service servers on behalf of the first application.

A method of managing communication exchanges is also described herein. In this method, a request for a backend service to be executed by one or more backend-service servers can be received from a first application via a common protocol. The first application may be controlled by a manufacturer and can be designed to run on a first OS. The backend service may be related to remote control operation of a vehicle manufactured by the manufacturer. The backend-service servers responsible for executing the request from the first application for the backend service can be identified, and the execution of the request from the first application can be coordinated with the backend-service servers on behalf of the first application. The first application can be signaled via the common protocol to indicate whether the request from the first application for the backend service is completed.

Also, a request for the backend service to be executed by the backend-service servers can be received from a second application via the common protocol. Like the first application, the second application may be controlled by the manufacturer but may be designed to run on a second OS. The second application is incompatible with the first OS, and the first application is incompatible with the second OS. The backend-service servers responsible for executing the request from the second application for the backend service can be identified, and the execution of the request from the second application can be coordinated with the backend-service servers on behalf of the second application. The second application can also be signaled via the common protocol to indicate whether the request from the second application for the backend service is completed. In one arrangement, coordination of the execution of the request from the second application with the backend-service servers can be simultaneous with coordination of the execution of the request from the first application with the backend-service servers on behalf of the first application.

As an example, the common protocol may include one or more extensions that are proprietary to the manufacturer, but the backend-service servers may rely on protocols for communications that are different from one another and the common protocol. As another example, coordination of the execution of the request from the first application with the backend-service servers can occur via the different protocols of the backend-service servers on behalf of the first application. Likewise, coordination of the execution of the request from the second application with the backend-service servers can occur via the different protocols of the backend-service servers on behalf of the second application.

In one arrangement, the first application can include a reusable-code section configured to facilitate the display of one or more predetermined UI elements associated with the manufacturer when the first application is executed on the first OS. Also, the second application can include the reusable-code section, and the reusable-code section is configured to facilitate the display of the predetermined UI elements associated with the manufacturer when the second application is executed on the second OS. The first application can also include a first native-code section configured to cause the generation of the request from the first application for the backend service to be executed by the backend-service servers. Similarly, the second application can include a second native-code section configured to cause the generation of the request from the second application for the backend service to be executed by the backend-service servers.

A system for facilitating requests for backend services related to remote control operation of vehicles manufactured by a manufacturer is also described herein. The system can include one or more network interface cards ("NIC") configured to receive the requests for backend services from a plurality of applications designed to run on a first OS and from a plurality of applications designed to run on a second OS. The applications of the second OS are incompatible with the first OS. The NIC is further configured to receive the requests from the applications of the first OS and the applications of the second OS via a common protocol. The applications of the first OS and the applications of the second OS may share a reusable-code section configured to facilitate the display of common UI elements associated with the manufacturer.

The system can also include one or more processors. The processor can be communicatively coupled to the NIC and can be configured to communicate with a first backend-service server via a first protocol and communicate with a second backend-service server via a second protocol. The first protocol and the second protocol are different from one another and the common protocol.

The processor can be configured to coordinate execution of the requests from the applications of the first OS with the first backend-service server via the first protocol and the second backend-service server via the second protocol. The processor can also be configured to coordinate execution of the requests from the applications of the second OS with the first backend-service server via the first protocol and the second backend-service server via the second protocol. The processor can be further configured to signal the applications of the first OS and the applications of the second OS via the common protocol with indications of the status of their requests for backend services.

As an example, the applications of the first OS include a first native-code section configured to generate the requests for the backend services for receipt by the system over the common protocol. The applications of the second OS can also include a second native-code section configured to generate the requests for the backend services for receipt by the system over the common protocol.

In one embodiment, the common protocol can include extensions that are proprietary to the manufacturer. The system can further include memory configured to cache information from the first backend-service server or the second backend-service server. The processor can be further configured to respond to some of the requests from the applications of the first OS or the applications of the second OS by retrievals of the cached information from the memory.

A system for facilitating requests for backend services related to remote control operation of vehicles manufactured by a manufacturer is also described herein. The system includes means for receiving the requests for backend services from a plurality of applications designed to run on a first OS and a plurality of applications designed to run on a second OS. Structure corresponding to such means is an NIC of a web-service server. The applications of the first OS are incompatible with the second OS, and the applications of the second OS are incompatible with the first OS. In addition, the requests from the applications of the first OS and the applications of the second OS are received via a common protocol. The applications of the first OS and the applications of the second OS may share a reusable-code section configured to facilitate the display of common UI elements associated with the manufacturer.

The system can also include means for communicating with a first backend-service server via a first protocol and for communicating with a second backend-service server via a second protocol. The first protocol and the second protocol may be different from one another and the common protocol.

The system can further include means for coordinating execution of the requests from the applications of the first OS with the first backend-service server via the first protocol and the second backend-service server via the second protocol and for coordinating execution of the requests from the applications of the second OS with the first backend-service server via the first protocol and the second backend-service server via the second protocol. The system can also have means for signaling the applications of the first OS via the common protocol with indications of the status of their requests for backend services and for signaling the applications of the second OS via the common protocol with indications of the status of their requests for backend services. Structure corresponding to such means for communicating, coordinating, and signaling is a processor of a web-service server configured and specifically programmed to carry out the processes and steps described herein.

As an example, applications of the first OS can include a first native-code section configured to generate the requests for the backend services for receipt by the system over the common protocol. As part of this example, the applications of the second OS can include a second native-code section configured to generate the requests for the backend services for receipt by the system over the common protocol. The system can also include means for caching information from the first backend-service server or the second backend-service server and means for responding to the requests from the applications of the first OS or the applications of the second OS by retrieving the cached information. Structure corresponding to such means for caching and responding are a processor of a web-service server configured and specifically programmed to carry out the processes and steps described herein and memory of the web-service server as described herein, in combination with one another.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures, unless otherwise specified.

For a better understanding of the subject matter described herein, reference will be made to the section below entitled "Detailed Description," which is to be read in association with the accompanying drawings.

DETAILED DESCRIPTION

Figure 1:
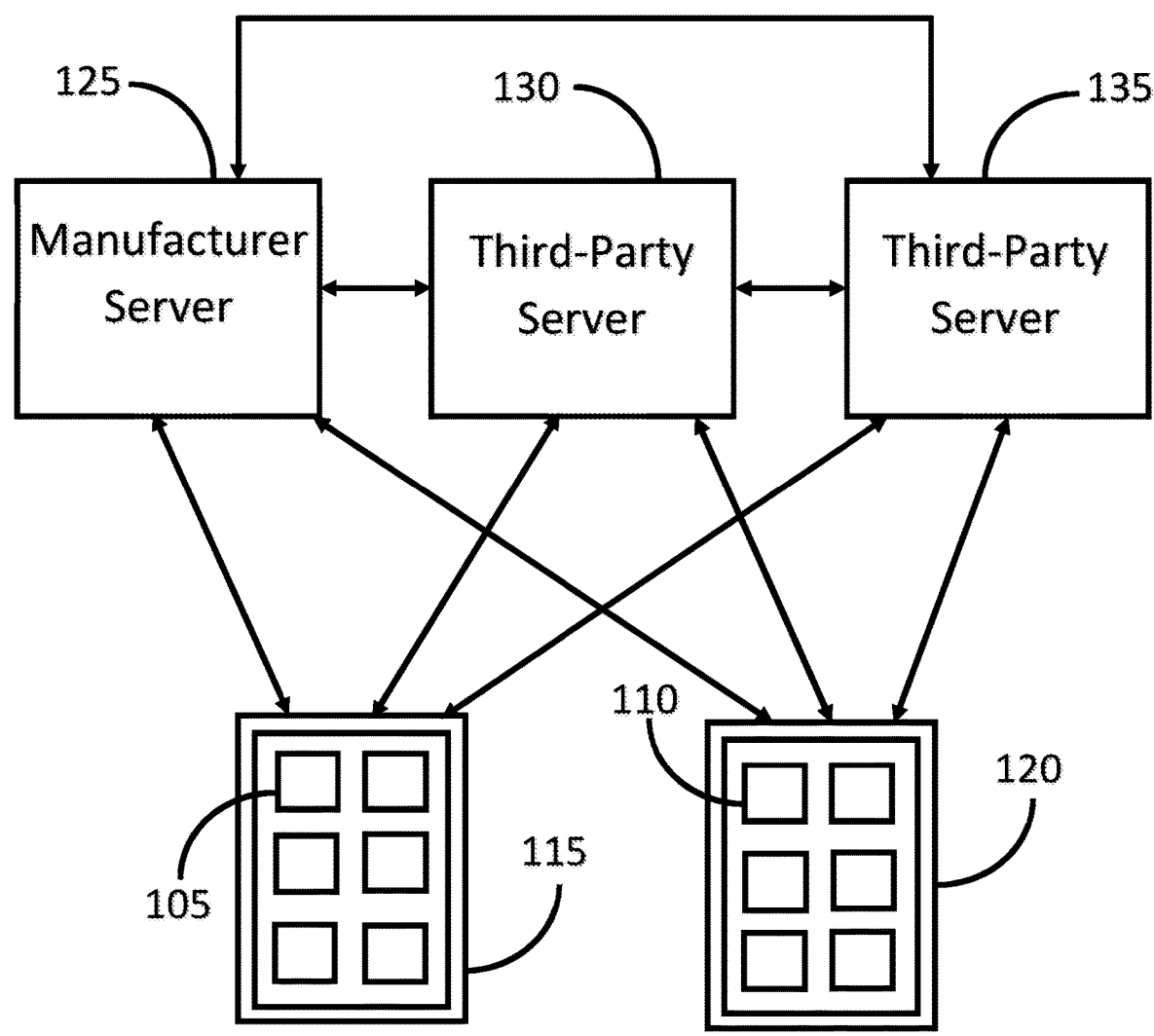
FIG. 1 illustrates a prior art system that supports communications between applications and backend-services servers.

As previously noted, the design of an application ("app") is often complicated because it may be required to communicate with multiple backend services, each of which is operated by a different company, to execute a task initiated by a user. Moreover, separate development teams must be staffed for each app designed for a particular operating system ("OS"). This current arrangement is not easily scalable and prevents the efficient delivery of additional services for the user.

To overcome this inefficient arrangement, a method and system for enabling the use of reusable code across apps of different OSs is presented herein. For a first app designed for a first OS, a first native-code section is defined as part of the first app, and the first native-code section is configured to communicate with a web-service server. The web-service server is configured to communicate with a plurality of backend-service servers, at least some of which are controlled by different entities. For the first app, a reusable-code section is also defined as part of the first app. The reusable-code section is configured to facilitate the display of one or more predetermined user-interface ("UI") elements when the first app is executed on the first OS.

In addition, for a second app designed for a second OS and incapable of executing on the first OS, a second native-code section is defined as part of the second app. The second native-code section is configured to communicate with the web-service server. Further, the reusable-code section defined for the first app is implemented as part of the second app. Like the first app, the reusable-code section is configured to facilitate the display of the predetermined UI elements when the second app is executed on the second OS. In this scheme, the web-service server may coordinate with the backend-service servers to process requests for backend services from the first and second apps, thus relieving the first and second apps of such complicated steps.

Because much of the complexity normally associated with the first and second apps has been tasked to the web-service server, the number of individuals required to construct and maintain the apps of an entity, like a vehicle manufacturer, across different OS s is greatly reduced. Moreover, this significant improvement does not result in the loss of any functionality of the apps. In fact, this arrangement is highly scalable and can lead to additional features for the apps and provides opportunities for more backend-service providers to participate.

Detailed embodiments are disclosed herein; however, the disclosed embodiments are exemplary in nature. Therefore, specific structural and functional details disclosed herein are not to be interpreted as limiting but merely as a representative basis for the claims and for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

Several definitions that are applicable here will now be presented. The term "reusable" is defined as capable of being used, shared, implemented, integrated, distributed, copied, installed, loaded, or processed more than once or otherwise recycled, such as in relation to different environments, including those whose applications are incompatible with the other. The term "reusable-code section" is defined as computer code or instructions, in human or machine form, that are reusable or at least 90% reusable. The term "native-code section" is defined as computer code or instructions, in human or machine form, that is designed for a specific system, such as an OS or a processor. The term "operating system" is defined as software that directs or controls a computer's operations. A "server" is defined as a computer programmed with software that provides functionality for computer programs or other computers. The term "backend service" is defined as any service or functionality provided by a server or other computer, whether individually or in combination with any number of other servers or computers.

The word "facilitate" is defined as to assist, make possible, enable, expedite, accelerate, advance, promote, or support an action, command, instruction, or process. The word "coordinate" is defined as to manage, enable, oversee, harmonize, synchronize, regulate, or organize one or more actions or processes. The word "control" is defined as to have power or influence over, including directly or through one or more intermediaries or other entities. The word "incompatible" is defined as unable to function, operate, run, or execute as designed or intended or prevented from such functioning, operating, running, or executing. The word "simultaneous" is defined as existing, occurring, or operating at the same time during the entire existence, occurrence, or operation or for only a portion of such existence, occurrence, or operation. The word "proprietary" is defined as belonging to or owned, controlled, or held exclusively by one or more entities. The phrase "defining a code section as part of an application" is defined as designing, modeling, developing, writing, implementing, establishing, or testing (or any combination of the foregoing) computer code for at least some part of an application, including statically or dynamically linked components.

A "head unit" is defined as a human-to-machine (HMI) hardware interface in or on a vehicle. A "vehicle" is defined as a movable structure for transporting humans, animals, or cargo (or any combination of them), and examples include cars, trucks, buses, trains (or other rail-based machines, airplanes or other forms of flight, or boats or other forms of water travel). A "protocol" is defined as a set of predefined rules, procedures, processes, instructions, commands, calls, or communications, or an established norm, standard, or requirement. The term "common protocol" is defined as a protocol that is followed, practiced, used, accepted, adopted, adhered to, or used by or adhered to or complied with two or more entities, devices, processes, machines, or applications, whether in its entirety or at least half of it. As an example, shared use of at least 50% of a protocol by two processes makes the protocol common in relation to the processes. The term "network interface card" (NIC) is defined as a computer hardware component that is configured to enable a computer to connect to a network.

A "processor" is defined as a component with some circuitry or a group of components with at least some of them with circuitry configured to execute instructions or that is programmed with instructions for execution (or both) to carry out or facilitate the processes described herein. Examples include single- and multi-core processor or co-processors. The term "memory" or "memory element" is defined as a structure that includes at least some circuitry (possibly along with supporting software or file systems for operation) and is configured to store data, whether temporarily or persistently. A "communication circuit" is defined as a circuit-based component configured to support or facilitate wired or wireless communications (or both), in accordance with any number and type of communications protocols. The phrase "communicatively coupled" is defined as a state in which signals may be exchanged between or among different components on a unidirectional, bidirectional, or multi-directional basis and includes direct or indirect connections, whether wired or wireless (or both).

The word "herein" means the specification, claims, and drawings of this application. The terms "a" and "an" are defined as one or more than one. The term "plurality" is defined as two or more than two. The term "another" is defined as at least a second or more. The terms "including" and "having" are defined as comprising (i.e., open language). The phrases "at least one of . . . and . . . " and "at least one of . . . or . . . " are defined to encompasses all possible combinations of one or more of the associated listed items. As an example, the phrase "at least one of A, B and C" includes A only, B only, C only, or any combination thereof (e.g., AB, AC, BC or ABC). Additional definitions may be presented below.

Referring to FIG. 1, a prior art system 100 that illustrates the interactions among existing apps and backend-service servers is presented. The system 100 includes an app 105 designed to execute on a mobile OS and a second app 110 configured to run on a different mobile OS. The app 105 is installed on a first smartphone 115, and the second app 110 is installed on a second smartphone 120. The system 100 also includes multiple backend-service servers, such as backend-service server 125, backend-service server 130, and backend-service server 135, each of which is connected through various networks (not shown) to the first smartphone 115 and the second smartphone 120.

Through these connections, the backend-service server 125, backend-service server 130, and backend-service server 135 provide services to the first app 105 and the second app 110. For example, the backend-service server 125 may be operated by an automobile manufacturer, and the backend-service servers 130, 135 may be managed by third parties, both of which have contracted with the manufacturer to provide services to the first app 105 and the second app 110 on behalf of the manufacturer. Significantly, both third parties and the manufacturer are independent entities and, as such, the process of communicating with each of the backend-service servers 125, 130, 135 may be quite complex.

One example of an interaction among these components is a request to remotely unlock a vehicle (not shown). In particular, the owner of the vehicle may initiate the request through the first app 105, and the first app 105 will establish communications with the backend-service server 125, which is maintained by the manufacturer of the vehicle, and the backend-service server 130, which is controlled by a third party, to have a remote unlock command sent to the vehicle. The exchange of communications among the first app 105, the backend-service server 125, and the backend-service server 130 involves multiple commands and acknowledgements across different protocols, which complicates the system 100. Accordingly, the first app 105 must be written to account for the implementation of both the backend-service server 125 and the backend-service server 130 and their interoperability. Even worse, as the number and variety of backend services increase, both first and second apps 105, 110 must be constantly updated to support the new functionalities. To do so, separate development teams need to be maintained to provide such updates and debug the first and second apps 105, 110.

Figure 2:
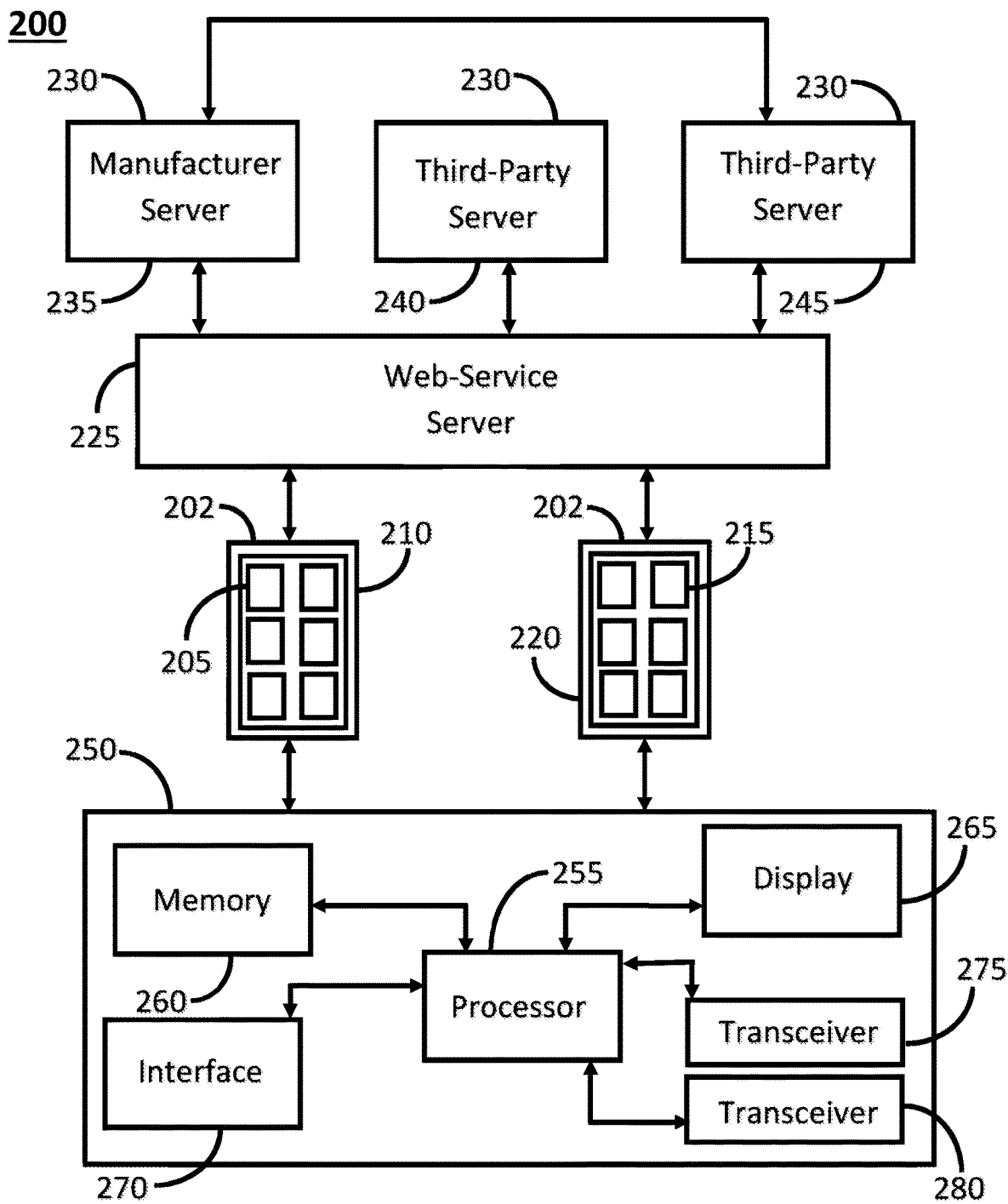
FIG. 2 illustrates an example of a system that supports communications among applications, a web-service server, and backend-service servers.

Referring to FIG. 2, an example of a system 200 that overcomes the serious inefficiencies of the prior art system 100 of FIG. 1 is illustrated. The system 200 can include one or more clients 202, each of which may be in the form of an app, to support user interactions on a device. For example, the system 200 can include a first app 205, a first smartphone 210 on which the first app 205 is installed, a second app 215, and a second smartphone 220 on which the second app 215 is installed. In one embodiment, the first and second apps 205, 215 are mobile apps that are designed to operate in mobile operating environments. For example, the first smartphone 210 may be equipped with a first mobile OS, like iOS (IOS®), and the first app 205 is designed to run on this OS. Continuing with the example, the second smartphone 220 may be configured with a second mobile OS, such as Android™, and the second app 215 is developed specifically for this OS. Both the first app 205 and the second app 215 may be compatible with only the mobile OS for which it was designed, meaning the first app 205 may not execute on a device running the second mobile OS and vice-versa. Nevertheless, as will be explained below, the first app 205 and the second app 215 may share a code base, which reduces the complexity of each.

The system 200 can also include a web-service server 225 and multiple backend-service servers 230. As an example, one of the backend-service servers 230 is controlled by a manufacturer, like a vehicle manufacturer, and one or more of the backend-service servers 230 are controlled by third parties who provide services to certain users, such as customers of the manufacturer. In this example, the backend-service server 230 controlled by the manufacturer is referred to as the manufacturer-backend-service server 235 or the manufacturer server 235. In addition, the two backend-service servers 230 controlled by third parties are called (respectively) third-party-backend-service server 240 and third-party-backend-service server 245, or third-party server 240 and third-party server 245.

The backend-service servers 230 are configured to provide backend services to a user. For example, the user may own, lease, or operate a vehicle (not shown), and one or more of the backend-service servers 230 may carry out one or more functions, sometimes working in conjunction with one another, in relation to the vehicle. Examples of some of these services will be presented below.

As many services may require interaction between multiple backend-service servers 230, the web-service server 225 is configured to coordinate the execution of a request from a user with respect to the backend-service servers 230.

As an example, a user may request a service through the first app 205, which the web-service server 225 can receive. In response, the web-service server 225 can manage the execution of the request on behalf of the first app 205 through several exchanges with one or more backend-service servers 230. Once the requested service is complete, the web-service server 225 can inform the user through the first app 205. As such, the logic necessary to carry out the request from the perspective of backend interaction is contained in the web-service server 225, as opposed to the first app 205.

To facilitate this aspect, the web-service server 225 is configured with the logic necessary to enable it to register and exchange signals with each of the participating backend-service servers 230. This registration and exchange of signals can include the web-service servicer 225 being provided with any necessary authentication data and the messaging protocols of each of the participating backend-service servers 230. The authentication data can maintain the integrity of these backend-service servers 230, and because the web-services server 225 adapts to the protocols of the servers 230, no changes are necessary to the existing messaging structure of these servers 230. As such, the implementation of the web-service server 225 allows the entities in control of the backend-service servers 230 to maintain their current application programming interfaces ("API") or other software interfaces or connectors for providing the backend services. Moreover, any modifications to the existing messaging structure, including the addition or removal of APIs related to the backend-service servers 230, can be easily integrated into a single platform, the web-service server 225, as opposed to re-adapting the clients 202, to enable their distribution.

The web-service server 225 can also be programmed to accommodate the interoperability between (or among) various backend-service servers 230 when they deliver services. For example, some services may require the involvement of multiple servers 230, and the web-service server 225 may be configured to account for the operations to be performed by each of the multiple servers 230. This arrangement enables the web-service server 225 to efficiently coordinate the execution of all the available backend services. Moreover, this setup makes the system 200 highly scalable, as many different backend-service servers 230, which may be controlled by numerous (unrelated) entities, can be integrated into the system 200 by simply reconfiguring the web-service server 225 as needed. This process can also increase the number and type of services that can be delivered to a user, without having to substantially reconfigure the clients 202.

Because the web-service server 225 is tasked with the responsibility of coordinating the execution of backend services, the messaging protocol between the server 225 and the clients 202 can be simple and uniform. In particular, the clients 202 may communicate with the web-service server 225 through a common protocol. For example, a standard set of APIs or other messaging scheme may be implemented to facilitate communications between the first app 205 and the web-service server 225 and between the second app 215 and the server 225. As such, even though the first app 205 and the second app 215 may be developed for different OSs, these clients 202 may rely on the same protocol for exchanging messages with the web-service server 225. In addition to this uniformity, the complexity of the APIs between the clients 202 and the web-service server 225 can be significantly reduced, as the server 225 is tasked with the function of coordinating the execution of services on behalf of the clients 202.

In one embodiment, the percentage of commonality in the protocol used by the clients 202 to communicate with the web-service server 225 can range from 100%, or identical usage, to at least 50%. For example, if the common protocol includes a set of APIs, the clients 202 may share anywhere from at least half to all of them. Further, the common protocol may be extensible, which can enable developers to implement added functionality in the clients 202. For example, in the case of APIs, extensions can be added to one or more of the APIs of the common protocol to increase functionality. The extensions may be shared, meaning any participating client 202 may take advantage of the ability to embed additional data in its calls with the web-service server 225, which could then be processed by the appropriate backend-service server 230.

In another case, at least some of or all the extensions can be proprietary to one or more entities, and only the clients 202 controlled by or related to these entities would or could use these extensions. In the case of clients 202 that are not controlled or related to these entities, the unrelated clients 202, web-service server 225, and the relevant backend-service server(s) 230 can be prevented from processing or can ignore the proprietary extensions, whether they are part of incoming or outgoing calls with respect to the unrelated clients 202. For purposes of this description, if an API includes an extension, whether shared or proprietary, the API is still considered common to the clients 202 that use the API as part of the common protocol, irrespective of whether the clients 202 are intended or permitted to use the extension.

In one embodiment, both the first smartphone 210 and the second smartphone 220 may be configured to interact with a head unit ("HU") 250 of a vehicle. The HU 250 can include a processor 255, memory 260, and a display 265, with the processor 255 being communicatively coupled to the memory 260 and the display 265. In one arrangement, the HU 250 may also include a hardware interface 270, first transceiver 275, and second transceiver 280, each of which may be communicatively coupled to the processor 255. As such, the processor 255 can manage the operations of each of these components of the HU 250.

As an example, the hardware interface 270 can be a connection structure that permits a wired connection between the HU 250 and another device, such as the first smartphone 210 or the second smartphone 220. The wired connection can be based on any suitable industry standard, such as any generation of Universal Serial Bus ("USB"). In addition, the first transceiver 275 can be a short-range wireless transceiver configured to establish wireless communications with another device, like the first smartphone 210 or the second smartphone 220, without the assistance of a network. The wireless connection can be compliant with any industry standard, such as Bluetooth or any of the Wi-Fi protocols. In this setting, the first smartphone 210 or the second smartphone 220 may serve as a conduit to enable communications between the HU 250 and a wireless network, like a cellular network, with the transceivers (not shown) of the first smartphone 210 or the second smartphone 220 supporting such an exchange. In addition to or in lieu of this arrangement, the second transceiver 280 of the HU 250 can be a long-range wireless transceiver configured to communicate with any suitable long-range wireless network, such as a cellular network. As such, the HU 250 may be capable of establishing and maintaining long-range communications without the assistance of a smartphone.

In one arrangement, the first smartphone 210, second smartphone 220, and HU 250 can be configured to enable the smartphones 210, 220 to interact with the HU 250 to increase the functionality of the HU 250. For example, the first smartphone 210 can be configured to cause the HU 250 to server as an external display for the smartphone 210, which can enable supported apps installed on the smartphone 210 to be shown on and accessible through the display 265 of the HU 250. Examples of supported apps include those for navigation, music playback, messaging, voice calls, and web searches. Controls associated with the HU 250, such as soft buttons for volume and playback or components for enabling voice commands, can also be used to manipulate the operation of the first smartphone 210 or the second smartphone 220.

Through this scheme, the clients 202 can also be mirrored on the HU 250, which can enable a user to interact with the clients 202 through the HU 250. These interactions can be conducted, for example, through the display 265 or via voice commands received by the HU 250 and can permit the user to request one or more backend services. Other clients (or apps) may also be mirrored on the HU 250 to provide access to the user.

The clients 202 may also be configured to cause one or more predetermined user-interface ("UI") elements to appear on the display 265 of the HU 250 or on some other device. For example, both the first app 205 and the second app 215 can be associated with the manufacturer of the vehicle containing the HU 250 and when executed, cause UI elements that are related to the manufacturer to appear on the display 265 or some other device. Some of these elements may include the manufacturer's logo or other marks, colors, or background designs that identify the manufacturer. These UI elements may also be specific to the type of vehicle produced by the manufacturer. In one embodiment, even though the first app 205 and the second app 215 are designed for disparate OS s, the predetermined UI elements caused to be displayed by the first app 205 can be identical to or at least substantially like those originating from the second app 215.

In another case, the clients 202 can be installed and directly executed on the HU 250, instead of being projected onto it by a smartphone. In this example, a user could interact with the first app 205 or the second app 215 through the HU 250, and the UI elements described above could also be shown on the display 265 or some other component. Such installed clients 202 may be designed specifically for the OS of the HU 250, meaning they could run natively on the HU 250. In addition to a smartphone or HU, a client 202 can be installed and executed on other suitable devices, like laptops or tablets or other components of a vehicle, like backseat displays of an infotainment system. Moreover, a user may interact with a client 202 without the presence of the HU 250. For example, the user may access the first app 205 on the first smartphone 210 while outside the vehicle or inside a vehicle that does not have an HU.

No matter how a client 202 is made available to a user, the user can initiate a request for a backend service. As noted earlier, some backend services may be directed to the vehicle. For example, several of the services may be actions taken by the vehicle that are triggered remotely, such as unlocking or locking the vehicle, starting or stopping the engine, activating or deactivating the headlights or horn, starting or stopping the climate system (or scheduling the starting or stopping of it), or starting, stopping, or scheduling a battery charge, or paying for parking.

As another example, some of the services may fulfill requests for data about the vehicle or its surrounding area, like fuel level, refuel calculations (how many miles or how much time before refueling is necessary), engine diagnostics, gas mileage, odometer readings, vehicle identification number ("VIN"), maintenance history, time remaining for a paid parking space, current vehicle location, or the location of gas or charging stations or dealerships. Other services may not necessarily be requested by a user, such as those that are prompted by a condition or an event. Examples include providing notifications or warnings concerning the vehicle, like recall notices, scheduled maintenance, or existing or potential failure or degradation of a component, such as brakes, batteries, or tires.

Backend services may also be requested from other platforms, such as one of the backend-service servers 230. For example, the manufacturer server 235 may request a service that seeks to obtain data from the user's vehicle, such as operational data related to the vehicle or consumption data associated with the user. Under this scheme, the manufacturer server 235 may request a current odometer reading of the user's vehicle, which could then be used to generate maintenance reminders to be delivered to the user. As an example, consumption data can include the frequency of refueling stops, from which the manufacturer server 235 could generate financial incentives to steer the user to a particular brand of fuel. The delivery of any backend services, no matter what component or entity initiates them, may be coordinated by the web-service server 225 through the common protocol.

There are many other backend services that may be delivered to a user, and the examples recited here are not meant to be limiting. In fact, the backend services may not necessarily be limited to those directed to a vehicle, as other machines or structures can take advantage of this arrangement.

As an option, if the backend services are for a vehicle, a user may register multiple vehicles to receive such services. For example, a user may access a client 202 and enroll the user's vehicle and one or more other vehicles owned by the user's family members. The client 202 can be further configured to include a switching feature that enables the user to toggle between the registered vehicles, thereby allowing services to be selectively rendered to each of the vehicles. Each of the family members may also enroll his or her vehicle (and other vehicles) through a client 202 on a smartphone.

However the common protocol is structured, it may implement a standard set of backend services, as one option. For instance, if the common protocol is made up of a standard set of APIs, these APIs can be designed to implement any of the backend services described above or other suitable services. As such, a predefined, uniform messaging scheme may be readily available for use by the apps of various entities, such as different vehicle manufacturers, even if the apps are configured for different OSs. As an example, the iOS and Android apps for a first manufacturer and the iOS and Android apps for a second manufacturer may all take advantage of the common protocol to exchange signals with the web-service server 225 to enable a user or some other entity to request a diverse array of backend services. This process can be performed without burdening the apps with all the logic normally required to initiate such services.

The common protocol may also be configured to accommodate any variations that arise from the existence of different OSs. For example, almost all mobile devices are required to process push notifications, and the scheme for doing so for one OS may be dissimilar to that of another OS. The common protocol can take these platform-specific variations into account to enable the web-service server 225 to deliver the push notifications to the different clients 202.

In one embodiment, the common protocol can be designed to require the clients 202 to supply data that may be necessary to carry out the backend service. For example, if the common protocol is constructed of APIs, the APIs may require certain information about the vehicle (like VIN, current location, or account identification ("ID")) or owner to be transmitted as part of a request for a service. This data can be cached, if possible, including by the client 202 or the web-service server 225, to reduce latency, and in one arrangement, the selections of the data fields can be agnostic with respect to the manufacturer of the vehicle to increase the protocol's uniformity. As noted earlier, the common protocol may be extensible (proprietary or shared), so extensions may be implemented to accommodate specific data fields for one or more manufacturers or brands of a manufacturer or for a particular client 202 of a manufacturer. (One example of such a data field may be the brand or version of a vehicle.) In addition, some of the common protocol may be restricted to one or more manufacturers, such as a set of APIs of the common protocol that may only be used by the clients 202 of a specific manufacturer.

Figure 3:
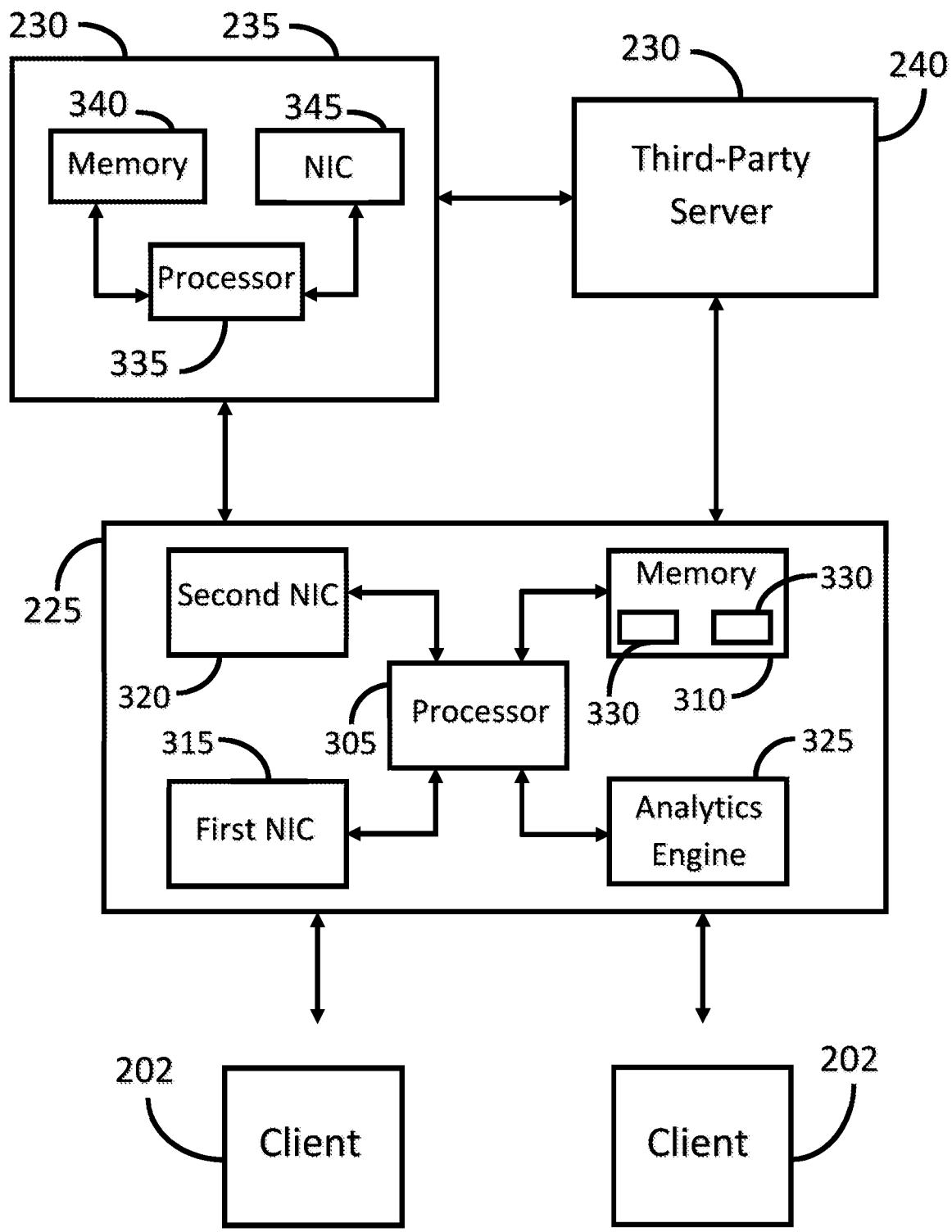
FIG. 3 illustrates an example of a web-service server and examples of several backend-service servers.

Referring to FIG. 3, the web-service server 225 and several backend-service servers 230 are illustrated. In this illustration, one of the backend-service servers 230 is a manufacturer server 235, and another server 230 is a third-party server 240, although other configurations are possible. As an example, the manufacturer server 235 is controlled by a manufacturer of vehicles, and the third-party server 240 is controlled by a third-party that provides satellite-based entertainment services to such vehicles.

In one embodiment, the web-service server 225 can include a processor 305, memory 310, a first network interface card ("NIC") 315, a second NIC 320, and an analytics engine 325. The processor 305 can be communicatively coupled to and manage the operation of each of the memory 310, first NIC 315, second NIC 320, and analytics engine 325.

The memory 310 can store various data, including instructions, to enable the web-service server 225 to carry out the processes described herein. As an example, the memory 310 can also include one or more caches 330 to cache information from the clients 202 or the backend-service servers 230. In one arrangement, the first NIC 315 can be configured to facilitate wired or wireless (or both) communications between the web-service server 225 and the clients 202, and the second NIC 320 can be configured to do the same for exchanges with the backend-service servers 230. To do so, both the first NIC 315 and second NIC 320 can include circuitry and software for receiving and transmitting wired or wireless signals (or both). Separate NICs may not be required, however, and in one embodiment, the web-service server 225 can have a single NIC.

The analytics engine 325 can be configured to analyze data based on the interactions among the clients 202, the web-service server 225, and the backend-service servers 230 or any other suitable set of these components and generate reports based on this analysis. The analytics engine 325 can include circuitry and software to enable it to analyze this data, and as an example, machine-learning ("ML") or artificial-intelligence ("AI") models may be part of the software. These models may process the collected data and identify trends or other criteria that may be part of the reports. Examples of the trends or criteria can include vehicle diagnostics or performance and user habits related to the use of backend services. These models can also be used to update other AI or ML software installed on other components, like other vehicles. In another option, the analytics engine 325 can be installed on some other device, like a vehicle or some other server, although the web-service server 225 could still provide data related to the users or their vehicles to the remotely located analytics engine 325.

In one arrangement, the manufacturer server 235 can include a processor 335, memory 340, and an NIC 345, and the processor 335 can be communicatively coupled to and control the operation of both the memory 340 and the NIC 345. Although not shown here, the third-party server 240 can include a similar configuration. As an example, the memory 340 can store data to enable the operation of the manufacturer server 235, and part of this data can include information about the owners, lessees, or users of the vehicles the manufacturer has sold or leased. In the case of the third-party server 240, some of the data its memory stores can include information about the owners, lessees, or users of the manufacturer's vehicles who receive or subscribe to the satellite-based entertainment services from the third party that controls the server 240. The NIC 345 can be configured to support communication exchanges between the manufacturer server 235 and the web-service server 225 and between the manufacturer server 235 and the third-party server 240. In one embodiment, both the manufacturer server 235 and the third-party server 240 can include an NIC or some other interface that can enable users who have installed one or more clients 202 on a device to exchange data directly with the manufacturer server 235 or the third-party server 240.

Figure 4:
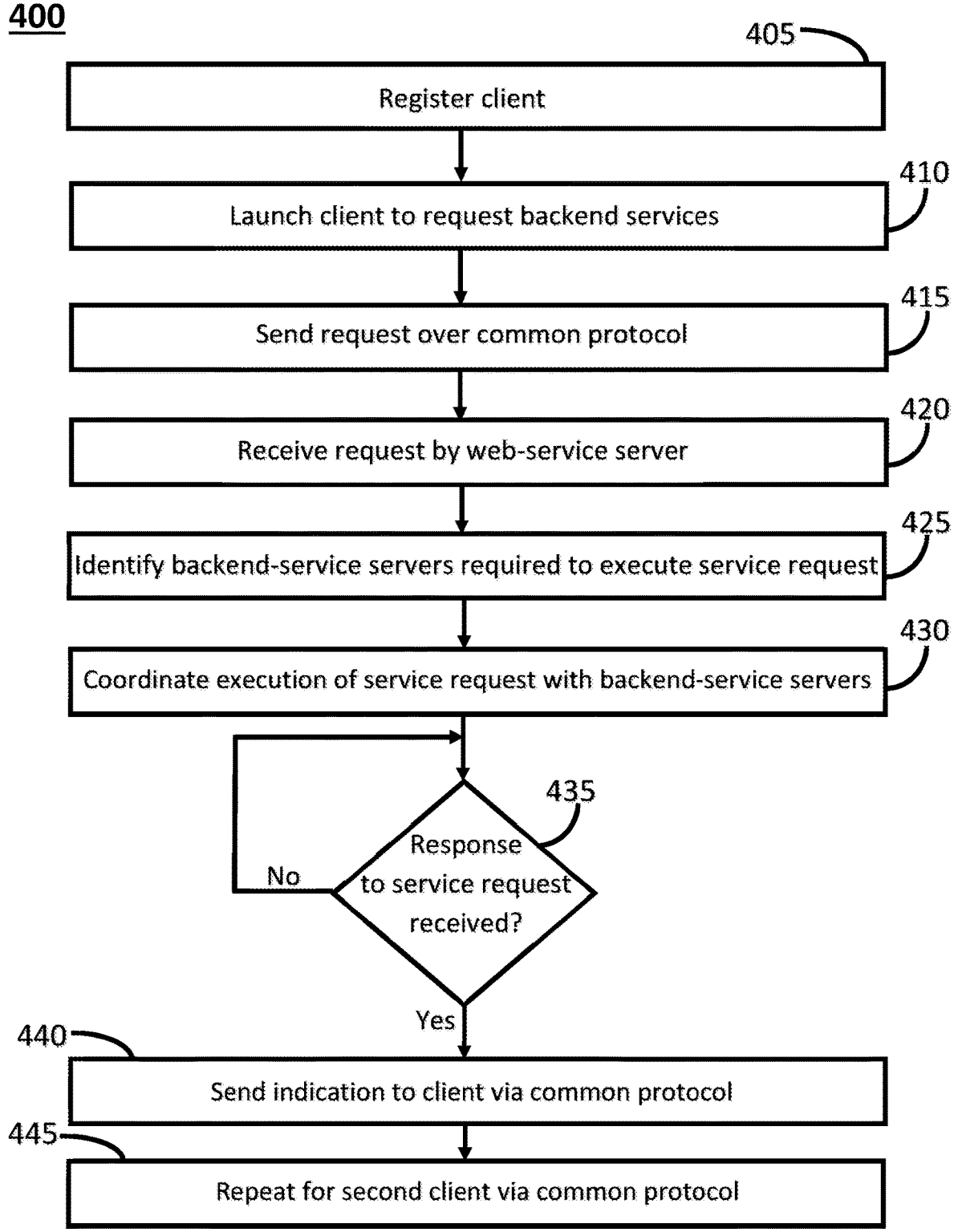
FIG. 4 illustrates an example of a method of managing communication exchanges.

Referring to FIG. 4, a method 400 of managing communication exchanges is illustrated. Although the steps of the method 400 are presented here in a chronological order, the method 400 and other concepts described herein are not necessarily limited to this sequence. Moreover, the method 400 may be altered to include additional or even fewer steps in comparison to that pictured in FIG. 4. A general overview of the method 400 will be presented initially, followed by a more granular (but non-limiting) description of the steps and several examples. Reference will be made to FIGS. 2 and 3 to help explain the method 400, although the method 400 may be practiced with other systems or components.

At step 405, a user may register a client to request backend services, and at step 410, the user may launch the client and request one or more services through the client. At step 415, the request can be sent over a common protocol, and at step 420, the request can be received by a web-service server. At step 425, the web-service server can identify any backend-service servers required for executing the service request and can coordinate the execution of this request with the identified backend-service servers, as shown at step 430. At decision block 435, if a response to the request for the backend service is received, the web-service server can send an indication to the client via the common protocol, as shown at step 440. At step 445, the method 400 can be repeated for a second user through a second client that uses the common protocol.

Consider the following example of a request to remotely unlock a vehicle owned by a user who has installed the first app 205 on the first smartphone 210. Initially, the user may launch the first app 205, which can generate a unique identification ("ID") and facilitate the registration and authentication of the user's account with the web-service server 225. This account can be related to the manufacturer of the user's vehicle. In this example, the user may subscribe to receive from a third party a satellite-based entertainment service through the user's vehicle. In one embodiment, the first app 205—via the web-service server 225—can also enable the registration and authentication of the user's account with respect to the third party. The web-service server 225 can then register and authenticate the user's account related to the manufacturer with the manufacturer server 235 and the user's account associated with the third-party with the third-party server 240.

Other arrangements are possible here. For example, an app related to the third party, which may be distinct from the first app 205, can enable the registration and authentication of the user's account with the third party with the third-party server 240. As another example, the user can use the first app 205 to first register and authenticate the user's account with the manufacturer with the manufacturer server 235. In these cases, the manufacturer server 235 and the third-party server 240 can (respectively) register and authenticate the user's accounts with the manufacturer and the third party with the web-service server 225. In another option, the first app 205 and the third-party app (if needed) may be installed on the HU 250 of the vehicle (or some other device), and the registration and authentication can be originated from there. As part of the registration and authentication steps, the user can provide relevant information about the user and the user's vehicle, such as year of manufacture, model, make, current mileage, VIN, account numbers, or other relevant information.

Following the registration and authentication process, the user may request, through the first app 205 on the first smartphone 210, the backend service of remotely unlocking the user's vehicle. In one arrangement, the first app 205 and the web-service server 225 can authenticate the session, and this authentication can be used to universally satisfy any verification requirements of the manufacturer server 235 and the third-party server 240. The exchanges between the first app 205 and the web-service server 225 may occur via the common protocol that has been established for their use. As an example, the first app 205 may signal the web-service server 225 through an API specifically designed to trigger a remote unlock of the vehicle. The request may include any data necessary to execute it, like VIN and account ID, and the processor 305 of the web-service server 225 may retrieve from the memory 310 at least some of this data if it has been cached.

Because the web-service server 225 is configured with the implementation details of the manufacturer server 235 and the third-party server 240, once the web-service server 225 receives the service request, the processor 305 of the web-service server 225 can coordinate the execution of this request with the manufacturer server 235 and the third-party server 240 on behalf of the first app 205. For example, the processor 305 can communicate with the manufacturer server 235 to receive authorization from the manufacturer server 235 for the unlock request. This exchange of signals can comply with the existing protocol established for the manufacturer server 235, meaning no changes to the APIs of the manufacturer server 235 are required to perform this service. The protocol for communications with the manufacturer server 235 is different from the common protocol, primarily because the manufacturer protocol may be proprietary or unique to the manufacturer.

Following authorization, the processor 305 of the web-service server 225 can communicate with the third-party server 240 to initiate the remote-unlock command. As part of this exchange, the web-service server 225 can provide to the third-party server 240 the authorization for the request from the manufacturer server 235 and any data required to execute the remote unlock.

While the third-party server 240 is performing the service, the processor 305 of the web-service server 225 may poll the server 240 for a response, and once the remote unlock is completed, the server 240 may signal the processor 305 with an appropriate indication. If the third-party server 240 was unable to process the request, such as if the vehicle could not be contacted, the server 240 can return an error condition to the processor 305 of the web-service server 225. In either case, like the manufacturer server 235, no changes are required to the APIs of the third-party server 240 for the remote-unlock service (or any other existing service). The protocol for communications with the third-party server 240 is also different from the common protocol and may be different from the protocol related to the manufacturer server 235, also because the protocol of the server 240 may be proprietary or unique to the third party.

Whichever indication is received from the third-party server 240, the processor 305 of the web-service server 225 may signal the manufacturer server 235 with an indication of the result. In addition, the processor 305 of the web-service server 225 can signal the first app 205 via the common protocol to indicate the status of the request, such as whether the backend service was successfully completed. Like the exchanges originating from the clients 202, the messages from the web-service server 225 (via the common protocol) can be uniform for multiple clients 202 related to various manufacturers. Accordingly, the processor 305 of the web-service server 225 can translate the diverse messages from various backend-service servers 230 and translate them into a form the clients 202 are expecting. In response, the first app 205 can generate an indication for the user.

In another example, a second user may have completed the registration and authentication process for a client 202, in this case, the second app 215 installed on the second smartphone 220. The second user may then initiate a request for a backend service through the second app 215. In this example, the service is for a remote unlock of the second user's vehicle, and the process described above can be repeated with respect to the second user's vehicle. As part of this process, the web-service server 225 can exchange signals with the second app 215 via the common protocol, similar to that for the first app 205. In fact, the web-service server 225 can coordinate the execution of both remote-unlock requests for the first and second users simultaneous to one another. As such, backend services can be carried out for multiple users at the same time (or at least with some overlap in time) using a common protocol, even if the clients 202 used by the users are designed for different OS s. This principle extends to additional circumstances, such as if other backend services are involved, the users own different brands of vehicles, or the users' vehicles are made by different manufacturers, each controlling its own manufacturer server 235.

In the previous example, a user initiated a backend service through a client 202. Backend services, however, may also originate from the backend-service servers 230 or the web-service server 225. For example, the manufacturer may want to issue a recall notice for a group of its vehicles, and the manufacturer server 235 may generate a notification and transmit it to the web-service server 225. The notification may include relevant data that the web-service server 225 can use to identify any affected vehicles, and, if necessary, the server 225 can retrieve data from its own memory 310 or poll the various clients 202 for additional information.

In response to the notification, the web-service server 225 can then signal (via the common protocol) the clients 202 that are associated with the affected vehicles, and the clients 202 can cause the recall notice to be rendered in a human-perceptible form for the users. The web-service server 225 can also signal the manufacturer server 235 with one or more returns indicating the success (or failure) of the deliveries of the recall notice to the affected vehicles. In this example, the manufacturer may generate a simple notification—without having to alter the APIs related to the manufacturer server 235—and hand off to the web-service server 225 the task of successfully distributing it to numerous clients 202 installed on a wide variety of platforms.

As noted above, the web-service server 225 may cache data it receives from the backend-service servers 230. For example, a user may have requested an engine-diagnostics report through a client 202, and this data may be generated by a third-party server 240. Once the web-service server 225 receives the diagnostics data from the third-party server 240, the server 225 can cache this information.

Caching data in this manner may enable the web-service server 225 to respond to requests for backend services when such services may not be available. For example, the manufacturer may restrict the generation of an engine-diagnostics report to once every thirty minutes for a particular client 202, as the manufacturer may be charged by the entity controlling the third-party server 240 for excessive use of this service. Thus, if the user requests another diagnostics report before the thirty-minute period has expired, the processor 305 of the web-service server 225 can simply retrieve the cached data, and the server 225 can direct the data to the requesting client 202. The web-service server 225 can execute this response without the need to signal the third-party server 240 (or any other backend-service server 230).

Once the thirty-minute period has expired, the web-service server 225 can respond to a new request for a diagnostics report in the normal manner. This caching procedure can apply to other backend services, and any of the backend-service servers 230 may implement restrictions that may force the web-service server 225 to respond to a request by retrieving cached data. This caching ability also enables the development of rules to be applied to the interactions between the web-service server 225 and the clients 202, and these rules may deviate from any rules set by the backend-service servers 230.

In the examples presented above, a backend service may involve the participation of multiple backend-service servers 230 or a single server 230. As such, the web-service server 225 can be configured to coordinate the delivery of services for many different backend-service servers 230, even if they are all controlled by different entities and each exposes a different set of APIs. Moreover, the system 200 is easily scalable, as new backend-service servers 230 can be implemented to accommodate an increase in users or offer new services for them. Irrespective of how complicated the arrangement among the web-service server 225 and the multiple backend-service servers 230 may be, the clients 202 may continue to receive the benefit of the services via the common protocol. Thus, restricting the communications of the clients 202 to the web-service server 225 via the common protocol, as opposed to interactions with multiple backend-service servers 230, can reduce the complexity of the clients 202.

In one embodiment, the clients 202 may be limited to exchanging communications with only the web-service server 225, meaning they may not communicate with any other device when requesting (or receiving) backend services. (Exceptions can be implemented for certain components, however, like the HU 250, particularly if the interactions are limited to projecting to the HU 250.) This restriction can enhance the security of the clients 202 and make them even easier to develop.

As explained above, tasking the web-service server 225 with coordinating backend services enables the clients 202 to receive such services and relieves them of the burden of interacting with multiple backend-service servers 230. Further, because the clients 202 rely on a common protocol for the services, the clients 202 can be developed to share substantial portions of code, even if they are designed for different OSs.

Figure 5:
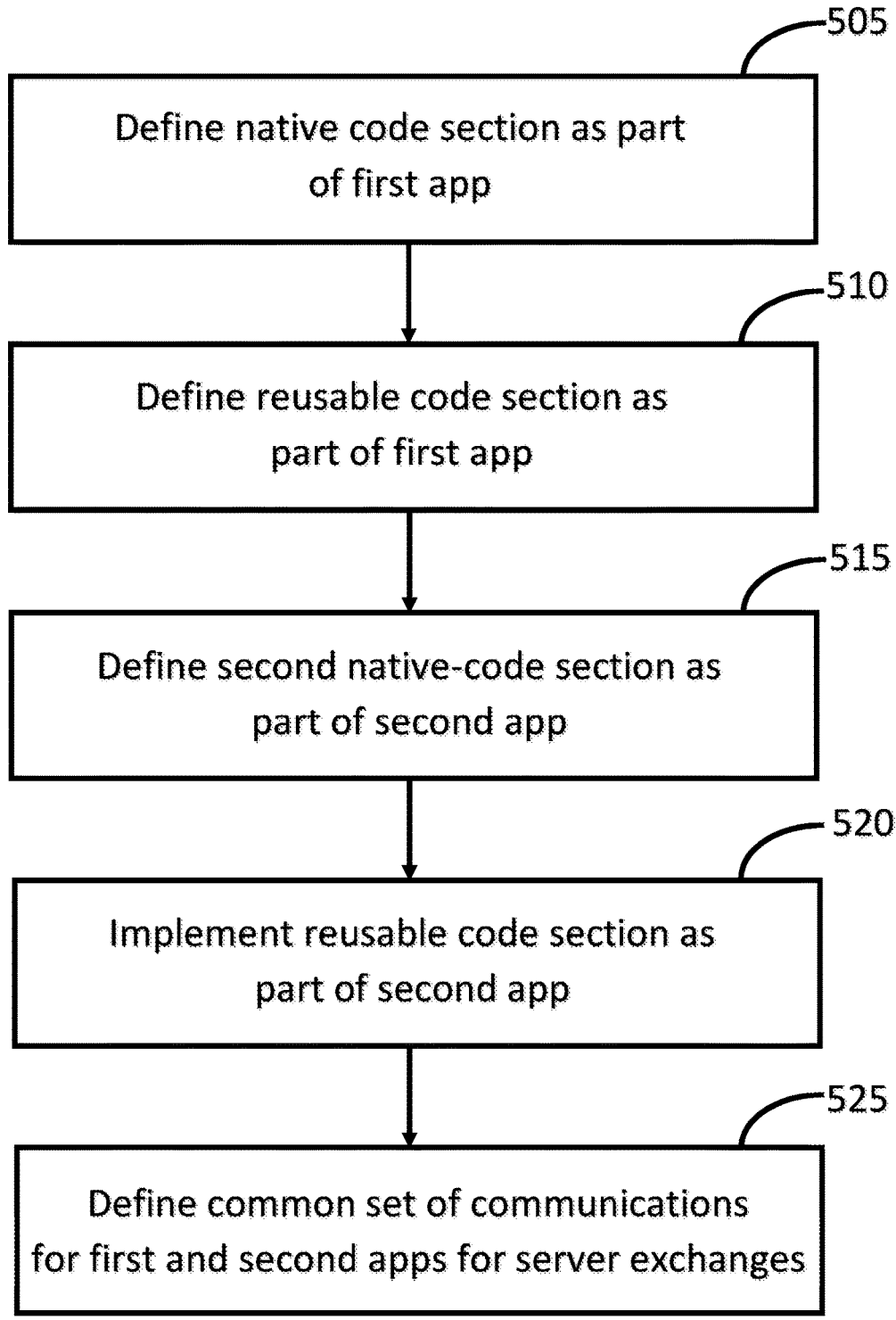
FIG. 5 illustrates an example of a method of enabling use of a reusable-code section across applications of different operating systems.

Referring to FIG. 5, a method 500 for enabling use of a reusable code base across apps of different OSs is shown. Although the steps of the method 500 are presented here in a chronological order, the method 500 and other concepts described herein are not necessarily limited to this sequence. Moreover, the method 500 may be altered to include additional or even fewer steps in comparison to that pictured in FIG. 5. A general overview of the method 500 will be presented initially, followed by a more granular (but non-limiting) description of the steps and several examples.

At step 505, a native-code section can be defined as part of a first app. At step 510, a reusable-code section can also be defined as part of the first app. At step 515, a second native-code section can be defined as part of a second app, and the reusable-code section can be implemented as part of the second app, as shown at step 520. At step 525, a common set of communications can be defined for the first and second apps for exchanges with a server.

Figure 6:
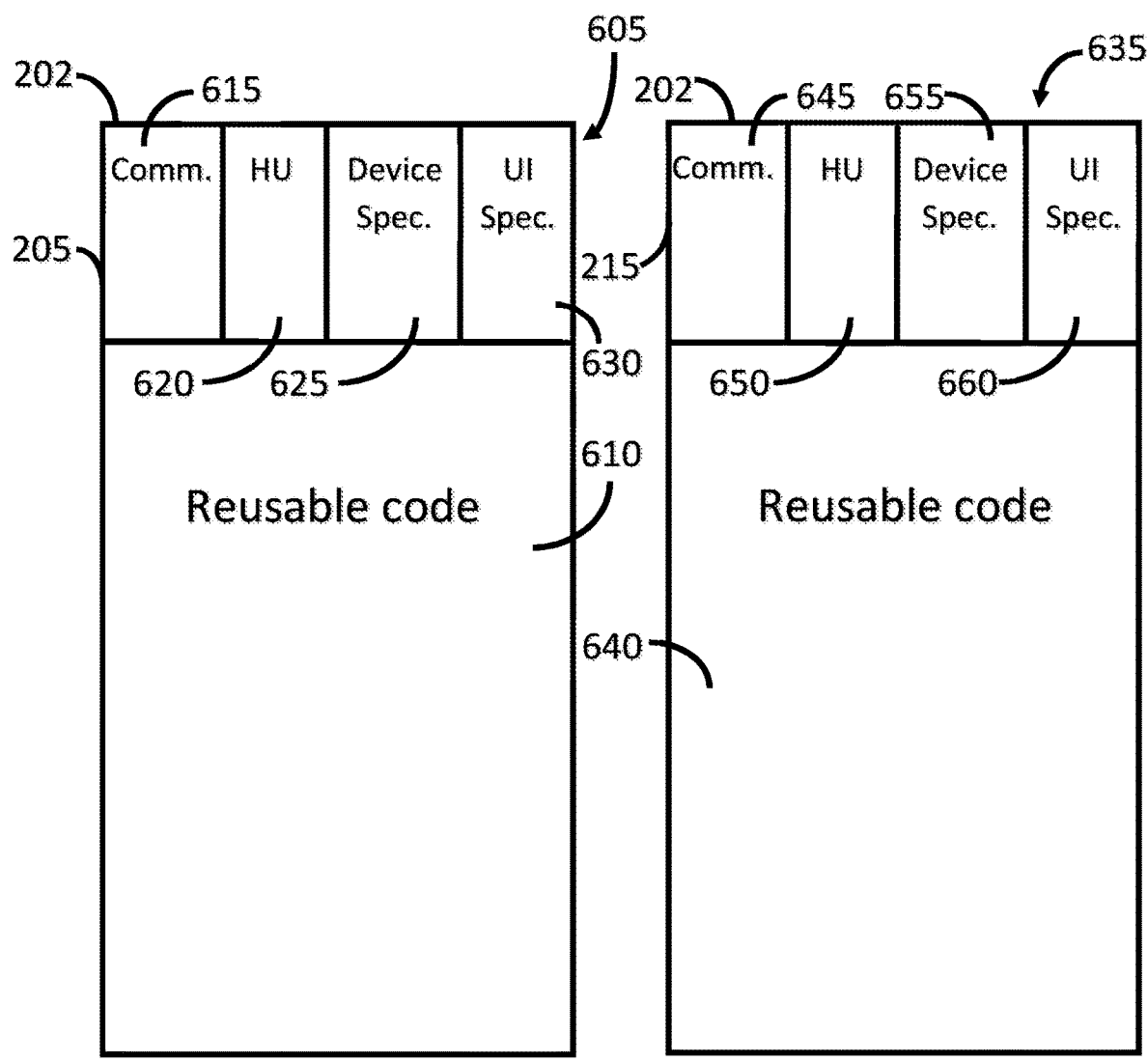
FIG. 6 illustrates examples of several clients.

Referring to FIG. 6, an example of two clients 202 in block-diagram form is shown. Reference will be made to FIGS. 2, 3, and 6 to help explain the method 500, although the method 500 may be practiced with other systems, components, or objects. In this example, one of the clients 202 is the first app 205, which can be installed on the first smartphone 210, and the other client 202 is the second app 215, which can be on the second smartphone 220. The first smartphone 210 may be loaded with a first OS for which the first app 205 is designed, and the second smartphone 220 may have a second OS installed on it for which the second app 215 is developed. Also in this example, the first app 205 is incompatible with the second OS, and the second app 215 is incompatible with the first OS.

The parts of a client 202 may be embedded in which they are statically linked with one another in the final composition of the client 202. Alternatively, any number of the parts may be delivered or accessed as discrete items in relation to the client 202, and they may be dynamically linked to when the client 202 is executed.

In one arrangement, the first app 205 can include a native-code section 605 and a reusable-code section 610, and the native-code section 605 can be made up of several sections or modules, such as a communications module 615, head-unit ("HU") module 620, device-specification module 625, and user-interface ("UI") specification module 630. Similarly, the second app 215 can include a native-code section 635 and a reusable-code section 640, and the native-code section 635 can have a communications module 645, HU module 650, device-specification module 655, and UI-specification module 660.

The native-code section 605 and the native-code section 635 may be developed with code that is native to the corresponding OS of the client 202. Specifically, the code of the native-code section 605 may be native to the first OS, and the code of the native-code section 635 may be native to the second OS. In one embodiment, the development and structure of the native-code sections 605, 635 may be based on the common protocol. That is, the native-code sections

605, 635 may be designed to exploit the uniformity in the common protocol and, hence, the interactions with the web-service server 225. Although the underlying native code of the native-code section 605 is incompatible with the second OS, all or at least substantial portions of the native-code section 605 may be implemented into any client 202 that runs on the first OS. The same principle applies to the native-code section 635, as it may be integrated into any client 202 that runs on the second OS.

The reusable-code section 610, however, may be developed with cross-platform code, or code that can run on or is agnostic to different platforms, including different OSs. As such, the reusable-code section 610 is compatible with both the first OS and second OS, and even though it may be developed for the first app 205, it can be re-used and implemented into the second app 215 as the reusable-code section 640. As an example, a cross-platform development tool, like React-Native, can be used to develop a reusable-code section. In one embodiment, the reusable-code section 610 may make up around 90% of the total code of the first app 205, with the remaining 10% developed as part of the native-code section 605. The proportions of the native-code section 635 and the reusable-code section 640 with respect to the second app 215 may be equivalent. As such, considerable shares of a client 202 may be reusable across different OSs.

In one arrangement, the reusable-code sections 610, 640 can be responsible for generating predetermined UI elements for display when the corresponding client 202 is executed. As an example, the UI elements can be displayed on the first smartphone 210, second smartphone 220, display 265 of the HU 250, or some other suitable device. For instance, if the first app 205 is related to a vehicle manufacturer, the reusable-code section 610 can be configured to cause one or more UIs associated with or indicative of the manufacturer or any of its brands to be displayed on the first smartphone 210 or the display 265 when the first app 205 is executed. As an example, the UI elements that are displayed for the first app 205 can be identical to those that are presented for the second app 215. This may be useful if a single organization is responsible for or controls the operation or distribution of the first app 205 and the second app 215 or if multiple organizations want to present similar UIs. This concept can also apply to any other element that is perceptible by a human, like audio to be broadcast or haptics to be triggered, when a client 202 is executed.

Some slight variations may exist between the reusable-code section 610 and the reusable-code section 640, primarily based on differences in the first OS and the second OS, such as how local notifications are rendered. Nevertheless, the amount of code that is reusable between clients 202 designed for different OS s is substantial, typically at least 90% or 95%.

Turning back to the native-code sections 605, 635, the communications modules 615, 645 may be configured to facilitate the exchanges with the web-service server 225 and maintain data about their corresponding vehicles. Further, the HU modules 620, 650 may be designed to facilitate exchanges with, for example, the HU 250, maintain connection data with the HU 250, and, in some cases, manage exchanges between a mobile network and apps that are projected onto the HU 250. The device-specification modules 625, 655 can be developed to maintain (respectively) certain characteristics of, for example, the first smartphone 210 and the second smartphone 220. Examples of these characteristics, which can be accessed when UI elements are to be displayed, include the established locale of the device (such as North America or Asia), selected language (such as English or French), or screen size and resolution. The UI-specification modules 630, 660 can be designed to specify the type of UI, like a skin or theme, to be presented (respectively) on the first smartphone 210 or the second smartphone 220 or the display 265 of the HU 250 or some other device. As an example, this selection is based on the identity of the manufacturer of the vehicle or a particular brand of the manufacturer. As an option, this selection feature can enable reusable code related to different manufacturers or other entities to be part of a reusable-code section 610, 640, and the code of the manufacturers (or entities) not selected can simply be ignored. The native-code section 605 and the native-code section 635 are not necessarily limited to this configuration, as they may not include each of the modules described above or may contain other modules not presented here.

In view of this exemplary construction, the clients 202 are versatile and present opportunities for improved efficiencies. For example, the native-code section 605 may be integrated into multiple clients 202 developed for different organizations that want to distribute a first app 205 for the first OS because it may be designed for a common set of communications for exchanges with the web-service server 225, or the common protocol. Likewise, the native-code section 635 may be implemented into the second apps 215 of these organizations that want to release an app that operates with the second OS. The native-code sections 605, 635 that may be integrated into the various clients 202 may be configured to accommodate specific requirements of each entity. Nevertheless, substantial portions of the code, like 90% or more, for each native-code section 605, 635 may be re-used (or shared) among the different clients 202 for their respective OSs.

This benefit can also be realized if an organization is comprised of multiple divisions, and each division releases clients 202 for both the first and second OS. As an example, a manufacturer may have several divisions, each one offering one or more different brands of vehicles. Each division may release a client 202 of the first and second OS for each of its vehicle brands. In this case, the native-code section 605 may be shared among the clients 202 of the first OS for each brand with minimal (if any) alterations, and this arrangement may be duplicated for the clients 202 of the second OS to be released by the divisions. The concept of re-using the native-code sections 605, 635 for clients 202 is not limited to departments of the same organization, however, as they may be recycled across different organizations, including corporations that are independent of one another.

The design of the clients 202 also provides a comparable benefit with respect to the reusable-code sections 610, 640. Consider the example above concerning the vehicle manufacturer with multiple divisions. Here, the reusable-code sections 610, 640 may be shared among the clients 202 of these divisions with virtually no modifications to the sections 610, 640, other than those necessitated by differences in the UI elements to be displayed for the divisions. Even changes originating from variations in the UIs of the divisions could be kept to a minimum if the manufacturer wants to display substantially similar UIs. (As explained earlier, there may be slight variations between a reusable-code section 610 and a reusable-code section 640 based on OS requirements.) This same principle could even be applied to several manufacturers, such as if the manufacturers were part of a joint venture or project.

The versatility offered by the clients 202 can be realized from the process of relocating the logic necessary to facilitate the execution of the backend services from the clients 202 to the web-service server 225. Adopting a common protocol for the exchanges between the clients 202 and the web-service server 225 can also contribute to this adaptability. Other benefits may arise from the commonality and reduced complexity across the clients 202. For example, fewer resources may be necessary for app development, including quality-assurance ("QA") testing, meaning an organization may be able to deliver its apps (including updates or upgrades) to the market much quicker. In fact, this design may enable the implementation of standard, automated testing, like one or more "smoke tests" to detect critical defects, because of the uniformity of the clients 202. Such testing can detect defects prior to human involvement in the QA process. The advantages outlined here, however, will not degrade the number or quality of the features associated with the organization's apps.

As described above, the systems, devices, methods, processes, and objects of FIGS. 2-6 may use or rely on one or more processors and memory elements for realizing the functions described herein. Any number of the processors may be specifically programmed to oversee the operation of other devices and systems and coordinate processes between all or any number of the components of the devices and systems. Any suitable architecture or design may be used for the processors. For example, a processor may be implemented with one or more single-core or multi-core architectures (or both).

Examples of processors that can be used herein include microprocessors, microcontrollers, digital-signal processors ("DSP"), and other circuitry that can execute software or cause it to be executed (or any combination of the foregoing). Further examples of suitable processors include a central processing unit ("CPU"), an array processor (or a vector processor), graphics-processing unit ("GPU"), a machine-learning processor ("MLP"), a field-programmable-gate array ("FPGA"), a programmable-logic array ("PLA"), an application-specific integrated circuit ("ASIC"), and programmable logic circuitry. A processor can include at least one hardware circuit (for example, an integrated circuit) configured to carry out instructions contained in program code.

In one arrangement, a processor can be part of a vehicle or can be contained in a smartphone or as part of some component in a network or some other system, including those that are located remotely to the smartphone or vehicle. If the processor is part of a vehicle, the processor can be, for example, integrated into an HU or some other component of the vehicle. In another arrangement, a system or device can include multiple processors in separate locations, such as a vehicle, smartphone, or network (or any combination thereof), and the processing for the system or device can be handled by any combination of these processors working together. As another example, a vehicle can have one or more connectors or interfaces configured to accept plug-ins of adjunct processors, which may be part of a portable device, like a laptop or some other machine. Any of the processors described herein may be dedicated to a specific task (like processing video data) or designed to handle multiple functions, whether simultaneously or not.

The memory (or memory element) can include any number of structures for storing data, such as instructions to enable any component of a system or device to perform one or more functions. The memory can be volatile or non-volatile in nature (or both), and examples of the memory include random-access memory ("RAM"), flash memory, read-only memory ("ROM"), programmable-read-only memory ("PROM"), erasable-programmable-read-only memory ("EPROM"), electrically erasable-programmable-read-only memory ("EEPROM"), registers, caches, magnetic disks, optical discs, hard drives, other storage media (e.g., semiconductor, magnetic, or optical based), or any combination thereof.

Any of the processors and memory may be communicatively coupled to one another to other devices via a wired or wireless network. For example, in the case of a wired network, the processors or memory may be communicatively coupled via a local area network (such as a controller-area-network ("CAN") bus). As another example, a processor or memory may be communicatively coupled via a Bluetooth or WiFi link or one that is based on a proprietary specification.

The invention claimed is:

1. A method for enabling use of reusable code across applications of different operating systems, comprising:
   for a first application designed for a first operating system of a first mobile computing device, defining a first native-code section as part of the first application, wherein defining the first native-code section includes:
      configuring a first communication module to facilitate communications between the first mobile computing device and a web-service server, wherein the web-service server is configured to communicate with a plurality of backend-service servers, at least some of which are controlled by different entities;
      configuring a first head unit module to facilitate communications between the first mobile computing device and a head unit of a vehicle;
      configuring a first device-specification module to maintain characteristics of the first mobile computing device; and
      configuring a first user-interface-specification module to maintain a type of user interface to present on the head unit;
   for the first application, defining a reusable-code section as part of the first application, wherein the reusable-code section is configured to facilitate the display of one or more predetermined user-interface elements on the head unit of a specific type of vehicle when the first application is executed on the first operating system by selecting the one or more predetermined user-interface elements, including specific background designs for the vehicle and a manufacturer of the vehicle, from a plurality of predetermined user-interface elements for a plurality of manufacturers and a plurality of vehicles based on the specific type of vehicle and the manufacturer of the vehicle;
   for a second application designed for a second operating system of a second mobile computing device and incapable of executing on the first operating system of the first mobile computing device, defining a second native-code section as part of the second application, wherein defining the second native-code section includes:
      configuring a second communication module to facilitate communications between the second mobile computing device and the web-service server;
      configuring a second head unit module to facilitate communications between the second mobile computing device and the head unit;
      configuring a second device-specification module to maintain characteristics of second first mobile computing device; and configuring a second user-interface-specification module to maintain a type of user interface to present on the head unit, including specific background designs for the vehicle and the manufacturer of the vehicle; and implementing as part of the second application the reusable-code section defined for the first application, wherein the reusable-code section is configured to facilitate the display of the predetermined user-interface elements on the head unit of the specific type of vehicle when the second application is executed on the second operating system by selecting the one or more predetermined user-interface elements, including the specific background designs for the vehicle and the manufacturer of the vehicle, from the plurality of predetermined user-interface elements for the plurality of manufacturers and the plurality of vehicles based on the specific type of vehicle and the manufacturer of the vehicle.

2. The method of claim 1, further comprising defining a common set of communications for use by the first communication module in exchanges between the first application and the web-service server and for use by the second communication module in exchanges between the second application and the web-service server.

3. The method according to claim 1, wherein the first application is configured to enable a user to select a service provided by one or more of the backend-service servers and is further configured to exchange communications related to the selected service with only the web-service server.

4. The method according to claim 3, wherein the web-service server is configured to manage the exchange of communications related to the selected service between itself and the backend-service servers on behalf of the first application.

5. A method of managing communication exchanges, comprising:

receiving from a first application via a common protocol a first request for a backend service to be executed by a plurality of backend-service servers, wherein the first application is controlled by a manufacturer and is designed to run on a first operating system and comprises a reusable-code section configured to facilitate display of one or more predetermined user-interface elements associated with the manufacturer on a head unit of a vehicle manufactured by the manufacturer when the first application is run on the first operating system by selecting the one or more predetermined user-interface elements, including specific background designs for the vehicle and the manufacturer, from a plurality of predetermined user-interface elements for a plurality of manufacturers and a plurality of vehicles based on the vehicle and the manufacturer of the vehicle, and wherein the backend service is related to remote control operation of the vehicle manufactured by the manufacturer;

identifying the plurality of backend-service servers responsible for executing the first request from the first application for the backend service;

coordinating the execution of the first request from the first application with the one or more target backend-service servers on behalf of the first application;

signaling the first application via the common protocol to indicate whether the first request from the first application for the backend service is completed;

receiving from a second application via the common protocol a second request for the backend service to be executed by the plurality of backend-service servers, wherein the second application is controlled by the manufacturer and is designed to run on a second operating system and comprises the reusable-code section configured to facilitate display of the one or more predetermined user-interface elements associated with the manufacturer on the head unit of a vehicle manufactured by the manufacturer when the second application is run on the second operating system by selecting the one or more predetermined user-interface elements, including the specific background designs for the vehicle and the manufacturer, from the plurality of predetermined user-interface elements for the plurality of manufacturers and the plurality of vehicles based on the vehicle and the manufacturer of the vehicle, wherein the second application is incompatible with the first operating system and the first application is incompatible with the second operating system;

identifying the plurality of backend-service servers responsible for executing the second request from the second application for the backend service;

coordinating the execution of the second request from the second application with the plurality of backend-service servers on behalf of the second application; and signaling the second application via the common protocol to indicate whether the second request from the second application for the backend service is completed.

6. The method of claim 5, wherein coordinating the execution of the second request from the second application with the plurality of backend-service servers further comprises coordinating the execution of the second request from the second application with the plurality of backend-service servers on behalf of the second application simultaneous with coordinating the execution of the first request from the first application with the plurality of backend-service servers on behalf of the first application.

7. The method of claim 5, wherein the common protocol includes one or more extensions that are proprietary to the manufacturer.

8. The method of claim 5, wherein the plurality of backend-service servers rely on protocols for communications that are different from one another and are different from the common protocol.

9. The method of claim 8, wherein coordinating the execution of the first request from the first application with the plurality of backend-service servers on behalf of the first application further comprises coordinating the execution of the first request from the first application with the plurality of backend-service servers via the different protocols of the plurality of backend-service servers on behalf of the first application; and wherein coordinating the execution of the second request from the second application with the plurality of backend-service servers on behalf of the second application comprises coordinating the execution of the second request from the second application with the plurality of backend-service servers via the different protocols of the plurality of backend-service servers on behalf of the second application.

10. The method of claim 5, wherein the first application further comprises a first native-code section configured to cause the generation of the first request from the first application for the backend service to be executed by the plurality of backend-service servers; and wherein the second application further comprises a second native-code section configured to cause the generation of the second request from the second application for the backend service to be executed by the plurality of backend-service servers.

11. A system for facilitating requests for backend services related to remote control operation of vehicles manufactured by a manufacturer, comprising:
a network interface card configured to receive the requests for backend services from a plurality of applications designed to run on a first operating system and a plurality of applications designed to run on a second operating system,
wherein the applications of the first operating system are incompatible with the second operating system and the applications of the second operating system are incompatible with the first operating system,
wherein the network interface card is further configured to receive the requests from the applications of the first operating system and the applications of the second operating system via a common protocol, and
wherein the applications of the first operating system and the applications of the second operating system share a reusable-code section configured to facilitate the display of common user-interface elements associated with the manufacturer of head units of the vehicles manufactured by the manufacturer, the common user-interface elements include specific background designs for the manufacturer or vehicle; and
a processor, wherein the processor is communicatively coupled to the network interface card and is configured to:
communicate with a first backend-service server via a first protocol;
communicate with a second backend-service server via a second protocol, wherein the first protocol and the second protocol are different from one another and the common protocol;
coordinate execution of a first request from a first application of the first operating system with the first backend-service server via the first protocol and the second backend-service server via the second protocol;
coordinate execution of a second request from a second application of the second operating system with the first backend-service server via the first protocol and the second backend-service server via the second protocol;
signal the first application of the first operating system via the common protocol to project, on a first head unit associated with the first application using the common user-interface elements and the specific background designs for the manufacturer or vehicle, an indication of the status of the first request for backend services; and
signal the second application of the second operating system via the common protocol to project, on a second head unit associated with the second application using the common user-interface elements and the specific background designs for the manufacturer or vehicle, an indication of the status of the second request for backend services.

12. The system of claim 11, wherein the applications of the first operating system include a first native-code section configured to generate the requests for the backend services for receipt by the system over the common protocol;
wherein the applications of the second operating system include a second native-code section configured to generate the requests for the backend services for receipt by the system over the common protocol.

13. The system of claim 11, wherein the common protocol includes extensions that are proprietary to the manufacturer.

14. The system of claim 11, further comprising memory configured to cache information from the first backend-service server or the second backend-service server and wherein the processor is further configured to respond to some of the requests from the applications of the first operating system or the applications of the second operating system by retrievals of the cached information from the memory.

15. A system for facilitating requests for backend services related to remote control operation of vehicles manufactured by a manufacturer, comprising:
means for receiving the requests for backend services from a plurality of applications designed to run on a first operating system and a plurality of applications designed to run on a second operating system that are incompatible with the first operating system;
wherein the requests from the applications of the first operating system and the applications of the second operating system are received via a common protocol;
wherein the applications of the first operating system and the applications of the second operating system share a reusable-code section configured to facilitate the display of common user-interface elements associated with the manufacturer on head units of the vehicles manufactured by the manufacturer;
means for communicating with a first backend-service server via a first protocol and for communicating with a second backend-service server via a second protocol, wherein the first protocol and the second protocol are different from one another and the common protocol;
means for coordinating execution of the requests from the applications of the first operating system with the first backend-service server via the first protocol and the second backend-service server via the second protocol and for coordinating execution of the requests from the applications of the second operating system with the first backend-service server via the first protocol and the second backend-service server via the second protocol; and
means for signaling the applications of the first operating system via the common protocol with indications of the status of their requests for backend services and for signaling the applications of the second operating system via the common protocol with indications of the status of their requests for backend services.

16. The system of claim 15, wherein the applications of the first operating system include a first native-code section configured to generate the requests for the backend services for receipt by the system over the common protocol;
wherein the applications of the second operating system include a second native-code section configured to generate the requests for the backend services for receipt by the system over the common protocol.

17. The system of claim 15, further comprising means for caching information from the first backend-service server or the second backend-service server and means for responding to the requests from the applications of the first operating system or the application of the second operating system by retrieving the cached information.

* * * * *